United States Patent
Akita et al.

(10) Patent No.: US 6,478,987 B1
(45) Date of Patent: Nov. 12, 2002

(54) PROTON CONDUCTING POLYMER, METHOD FOR PRODUCING THE SAME, SOLID POLYMER ELECTROLYTE AND ELECTRODE

(75) Inventors: Hiroshi Akita, Wako (JP); Masao Ichikawa, Wako (JP); Masaru Iguchi, Wako (JP); Hiroyuki Oyanagi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/664,089

(22) Filed: Sep. 18, 2000

(30) Foreign Application Priority Data

Sep. 20, 1999 (JP) .......................................... 11-265113

(51) Int. Cl.$^7$ ........................... H01B 1/12; M01M 8/10; M01M 4/02
(52) U.S. Cl. ........................... 252/500; 439/33; 439/42; 439/192
(58) Field of Search ........................ 252/500; 528/210, 528/422; 429/33, 192, 42

(56) References Cited

U.S. PATENT DOCUMENTS

| | | | |
|---|---|---|---|
| 4,629,540 A | 12/1986 | Geniès et al. ................. 204/59 |
| 5,432,023 A | 7/1995 | Yamada et al. ................. 429/34 |
| 5,525,436 A | 6/1996 | Savinell et al. ................. 429/30 |
| 5,585,038 A | 12/1996 | Kirnmanen et al. ......... 252/500 |
| 5,716,727 A | 2/1998 | Savinell et al. ................. 429/33 |
| 5,733,696 A | 3/1998 | Takahashi et al. ............. 430/59 |
| 5,997,770 A | 12/1999 | Ho et al. ..................... 252/500 |
| 6,025,085 A | 2/2000 | Savinell et al. ................ 429/33 |
| 6,099,988 A | 8/2000 | Savinell et al. ............. 429/189 |
| 6,124,060 A | 9/2000 | Akita et al. .................. 429/307 |
| 6,241,913 B1 * | 6/2001 | Angelopoulos et al. ...... 252/500 |
| 6,303,053 B1 * | 10/2001 | Akita et al. .................. 252/500 |

FOREIGN PATENT DOCUMENTS

| | | |
|---|---|---|
| EP | 0 697 705 A1 | 2/1996 |
| GB | 989559 | 7/1962 |
| JP | 06029159 | 2/1994 |
| WO | WO/93/22775 | 11/1993 |

OTHER PUBLICATIONS

Spetseris et al "Liner and hyperbranched m–polyaniline synthesis of polymers for the study of magnetism . . . ", Macromolecules, 31, 3158–3161, 1998 (May).*

Ward et al "Inhibition of crosslinking in meta–polyaniline through the use of n–protecting groups", Polymer Preprints, 39(2), Aug. 1998, p. 593. (Abstract Only).*

Tang et al "Electropolymerization of Anline Modified by Para–Phenylenediamine", Electroch. Acta., 40(7), 849–857, 1995.*

* cited by examiner

*Primary Examiner*—Mark Kopec
(74) *Attorney, Agent, or Firm*—Lahive & Cockfield, LLP

(57) ABSTRACT

A proton conducting polymer obtained by blending an organic phosphoric acid compound solution with a meta type polyaniline solution; a solid polymer electrolyte for a fuel cell comprising the proton conducting polymer, which is excellent in proton conductivity, methanol barrier property and dopant stability in an aqueous solution of methanol; and an electrode comprising the proton conducting and fine catalyst particles carried on porous particles.

5 Claims, 2 Drawing Sheets

—◯— Meta type polyaniline
(doped with 0.75 molecule/NH group)

----△---- PBI (doped with 1.0 molecule/NH group)

—◯— Meta type polyaniline
(doped with 0.75 molecule/NH group)

----△---- PBI (doped with
1.0 molecule/NH group)

PROTON CONDUCTING POLYMER, METHOD FOR PRODUCING THE SAME, SOLID POLYMER ELECTROLYTE AND ELECTRODE

FIELD OF THE INVENTION

The present invention relates to a proton conducting polymer, a method for producing the same, a solid polymer electrolyte and an electrode.

BACKGROUND OF THE INVENTION

In recent years, fuel cells have occupied an important position as next generation type clean energy sources. Above all, a solid polymer electrolyte type fuel cell is one in which both anode and cathode electrodes are each arranged across a solid polymer electrolyte membrane intervening therebetween. For example, in the case of a direct methanol type fuel cell (hereinafter referred to as a "DMFC") in which methanol is used as a fuel, methanol is supplied to the anode side, and oxygen or air to the cathode side, thereby allowing electrochemical reaction to occur to generate electricity. Solid polymer electrolyte membranes having high proton conductivity have been developed for retaining the characteristics of their high output and high energy density, and for obtaining small-sized, lightweight fuel cells. The solid polymer electrolyte membrane used in the DMFC is required to have the barrier property to fuel methanol, that is to say, reduced permeability (cross-over) of fuel methanol from the anode side of the membrane to the cathode side thereof.

Previously, hydrated membranes of perfluorosulfonic acid polymers such as Nafion (trade name) manufactured by E. I. du Pont de Nemours and Company) have generally been used as the solid polymer electrolyte membranes. The structure of Nafion is represented by the following general formula (I):

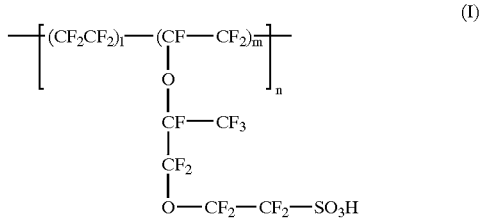

(I)

The above-mentioned hydrated membranes of perfluorosulfonic acid polymers have high proton conductivity, and the proton conductivity is exhibited by the generation of a channel structure caused by hydration (conduction of hydrated protons). That is to say, the conduction of protons takes place through water as a medium in the hydrated membranes of perfluorosulfonic acid polymers, and a specified amount of water exists in the hydrated membranes. Accordingly, methanol having high affinity with water easily passes through the membranes, so that the hydrated membranes of perfluorosulfonic acid polymers have a limitation with regard to the methanol barrier property.

Besides, as a polymer having proton conductivity independent of water, polybenzimidazole (PBI) doped with a strong acid such as phosphoric acid (hereinafter referred to as "acid-doped PBI") is known. Specifically, PBI includes poly-[2,2'-(m-phenylene)-5,5'-bibenzimidazole] represented by the following general formula (II):

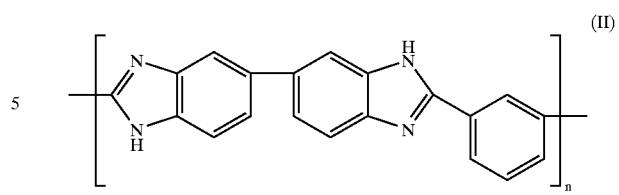

(II)

With respect to the conduction mechanism of the above-mentioned acid-doped PBI membrane, it is said that proton hopping occurs through acids coordinated to N—H groups contained in PBI, a base polymer, and that the proton hopping does not accompany movement of water. Then, the acid-doped PBI membranes have been expected to be significantly low in the cross-over amount of methanol, and excellent in methanol barrier property. However, the acid-doped PBI membranes have the disadvantage that elimination of dopants such as inorganic acids is liable to occur in an atmosphere of water/methanol (liquid fuel).

The present inventors have previously invented acid-doped PBI membranes in which dopant elimination is difficult to occur, and which are excellent in methanol barrier property by using diphenylphosphoric acid as a dopant in an amount of one molecule per N—H group in PBI (Japanese Unexamined Patent Publication No. 2000-38472).

For improving the proton conductivity of the above-mentioned acid-doped PBI membranes, it is preferred that the N—H group density of the base polymers is increased and that the density of acid components coordinated to the N—H groups is increased. Further, for conducting protons in the solid polymer electrolyte membranes, the base polymers preferably have a low glass transition temperature (Tg) and a flexible molecular structure. Furthermore, from the viewpoint of chemical stability required for the solid polymer electrolyte membranes used in fuel cells, the proton conducting polymers are preferably aromatic polymers.

PBI that has hitherto been used as the acid-doped PBI membranes has imidazole rings, and two nitrogen atoms having unshared electron pairs exist in each imidazole ring. One nitrogen atom exists as an N—H group, and the other nitrogen atom constitutes a double bond. The unshared electron pair of the nitrogen atom constituting the double bond contribute to the formation of a π electron resonance structure of the imidazole ring. However, the unshared electron pair of the nitrogen atom of the N—H group of the imidazole ring is kept free. It is therefore presumed that the substantial electron arrangement of the nitrogen atom of the N—H group of the imidazole ring approximates to the electron arrangement of a nitrogen atom of an N—H group connecting two aromatic rings.

A polymer having such an N—H group connecting two aromatic rings is a polyaniline. The molecular structure thereof is simpler than that of PBI, and the N—H group density thereof is high. The polyanilines include a polyaniline in which aromatic rings are bonded at the para-positions (hereinafter referred to as a "para type polyaniline"), and a polyaniline in which aromatic rings are bonded at the meta-positions (hereinafter referred to as a "meta type polyaniline"). The para type polyaniline has a π conjugate structure, so that itself has electrical conductivity. Accordingly, although an acid-doped para type polyaniline obtained by doping the para type polyaniline with an acid component shows proton conductivity, it can not be used as a material for the solid polymer electrolyte membrane used in the fuel cell.

On the other hand, the meta type polyaniline can not have a π conjugate structure, so that it can not exhibit electrical conductivity as it is. Further, synthesis thereof is difficult, and therefore only a few examples of electrolytic polymerization of aniline under special conditions are reported for synthesis methods thereof [T. Ohsaka et al., *J. Electroanal. Chem.*, 161, 399 (1984), A. Volkov et al., *J. Electroanal. Chem.*, 115, 279 (1980), and Onuki, Matsuda and Koyama, *Nippon Kagaku Kaishi*, 11, 1801 (1984)].

However, the meta type polyaniline has proton selective permeability (proton conductivity). Accordingly, there is an example in which it is evaluated as a PH sensor usable in metal ion-containing solutions [Onuki, Matsuda and Koyama, *Nippon Kagaku Kaishi*, 11, 1801 (1984)].

The meta type polyaniline has a flexible molecular structure, compared with the above-mentioned para type polyaniline. From the above, the meta type polyaniline having no electrical conductivity and having the flexible molecular structure is anticipated to exhibit the proton conductivity by acid doping, and to be applied as a novel solid polymer electrolyte material for fuel cells.

Furthermore, as an electrode used in a solid polymer electrolyte type fuel cell, a so-called MEA (membrane electrode assembly) is known. In the MEA, electrodes are formed of fine noble metal catalyst particles supported on carbon, a solid polymer electrolyte component formed on surfaces of the fine catalyst particles, and a fluorine resin for adhering the fine catalyst particles to one another. The electrodes are each arranged on two main planes of a solid polymer electrolyte membrane, thereby constituting a fuel cell (Japanese Unexamined Patent Publication No. 5-36418).

It is also conceivable that the above-mentioned acid-doped polyaniline (hereinafter referred to as an "acid-doped polyaniline"), that is to say, the proton conducting polymer, is used as the solid polymer electrolyte component formed on the surfaces of the fine catalyst particles, when it is high in proton conductivity.

SUMMARY OF THE INVENTION

The present invention has been made against a background of the current problems of the proton conducting polymers as the solid polymer electrolyte materials as described above, and attention has been given to the meta type polyaniline having the molecular structure desirable for the proton conducting polymers.

An object of the invention is to provide a proton conducting polymer.

Another object of the invention is to provide a method for producing the same.

A further object of the invention is to provide a solid polymer electrolyte comprising the proton conducting polymer, which is excellent in proton conductivity, methanol barrier property and stability of dopant in an aqueous solution of methanol.

A still further object of the invention is to provide an electrode comprising the proton conducting polymer and fine catalyst particles carried on porous particles.

The present inventors have conducted intensive investigation for attaining the above-mentioned objects. As a result, the inventors have discovered that a proton conducting polymer, a method for producing the same, a solid polymer electrolyte comprising the proton conducting polymer, which is excellent in proton conductivity, methanol barrier property and stability of dopant in an aqueous solution of methanol, and an electrode comprising the proton conducting polymer and fine catalyst particles carried on porous particles are provided by doping a meta type polyaniline with an inorganic acid or an organic phosphoric acid compound, thus completing the invention.

The invention provides a proton conducting polymer comprising a polyaniline.

It is preferred that 70 mole percent or more of aromatic rings in repeating units of the above-mentioned polyaniline are bonded at the meta-positions.

The aromatic rings in the repeating units of the above-mentioned polyaniline may have at least one substituent.

The above-mentioned proton conducting polymer is preferably obtained by doping the polyaniline with a strong acid or an acid compound.

The above-mentioned strong acid or acid compound is preferably an inorganic acid or an organic phosphoric acid compound.

The above-mentioned inorganic acid is preferably phosphoric acid and/or sulfuric acid.

Further, the invention provides a method for producing a proton conducting polymer, which comprises dissolving a polyaniline and an organic phosphoric acid compound in a common solvent, and casting the resulting solution.

Still further, the invention provides a solid polymer electrolyte comprising the above-mentioned proton conducting polymer.

Yet still further, the invention provides an electrode comprising the above-mentioned proton conducting polymer and fine catalyst particles carried on porous particles.

BRIEF DESCRIPTION OF THE DRAWINGS

These and other objects and advantages of this invention will become more apparent and more readily appreciated from the following detailed description of the presently preferred exemplary embodiments of the invention taken in conjunction with accompanying drawings, of which.

DESCRIPTION OF THE PREFERRED EMBODIMENTS

The invention provides a proton conducting polymer containing a polyaniline. The polyaniline is preferably a meta type polyaniline.

Methods for producing the meta type polyaniline include a method of polymerizing aniline in an organic solvent, preferably at a PH of 7 or more (under neutral to alkaline conditions). This polymerization reaction is chemical oxidation polymerization, and indicated by the following reaction scheme (III):

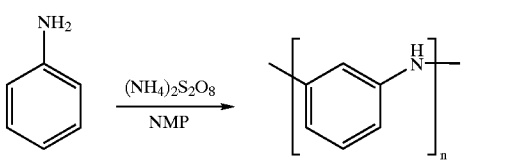

(III)

The meta type polyaniline is produced, for example, by the following method. That is to say, aniline is dissolved in 1 to 100 parts by volume, preferably 5 to 50 parts by volume per part by volume of aniline of an organic solvent such as N-methyl-2-pyrrolidone (NMP), and an oxidizing agent such as ammonium peroxodisulfate is added thereto in an amount of 90 to 130 mole percent based on aniline, at −20° C. to 50° C., preferably at −5° C. to 0° C., all at once or for 30 minutes to 72 hours, more preferably for 12 hours to 24 hours. The resulting solution is stirred overnight while gradually lowering the temperature of the solution to room temperature. Then, the reaction solution is poured into a large excess of deionized water to obtain a solid material. The solid material thus obtained is repeatedly washed with deionized water and acetone, followed by washing with deionized water. Then, the solid material is vacuum dried at room temperature to 200° C., preferably at about 100° C.

In the production of the above-mentioned meta polyaniline, aniline derivatives each having at least one substituent on an aromatic ring may be used as starting materials. The number of the substituent(s) is from 1 to 5, and preferably 1 or 2. In that case, the polyaniline produced has the substituents on the aromatic rings in repeating units.

The aniline derivatives having the substituents used as a starting material include toluidine, anisidine, aminobenzoic acid, aminobenzotrifluoride and phenylenediamine.

Using the aniline derivatives having the substituents as a starting material, a polyaniline having at least one substituent at the aromatic rings in the repeating units thereof can be obtained.

The reaction solvents that can be used include organic solvents such as N,N-dimethylsulfoxide (DMSO), N,N-dimethylacetamide (DMAc) and N,N-dimethylformamide (DMF), and deionized water alkalified by addition of NaOH or KOH, as well as NMP described above. For improving the solubility and thus increasing the molecular weight, metal salts such as LiCl and $CaCl_2$ may be added.

The oxidizing agents that can be used include iron (III) chloride, manganese dioxide and hydrogen peroxide, as well as ammonium peroxodisulfate described above. Preferred is ammonium peroxodisulfate.

Figure 1:
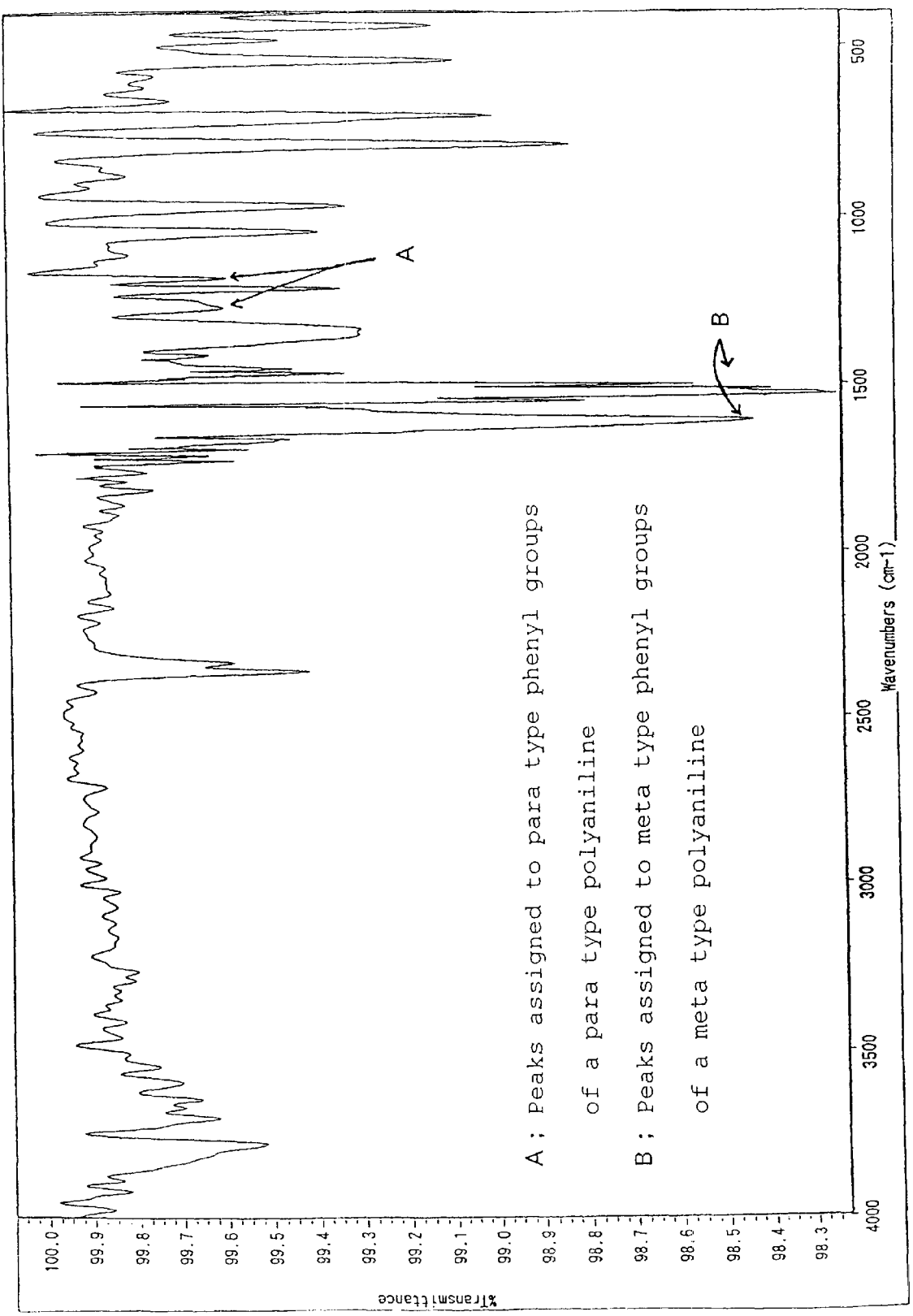
FIG. 1 is an IR chart of a proton conducting polymer obtained by blending a polyaniline obtained in Reference Example 1 with 0.5 molecule per repeating unit of diphenylphosphoric acid, and casting the resulting mixture.

FIG. 1 is a chart of an IR absorption spectrum of a proton conducting polymer obtained by blending a polyaniline with 0.5 molecule per repeating unit of diphenylphosphoric acid, and casting the resulting mixture. As shown in FIG. 1, the formation of the meta type polyaniline is confirmed by the presence of peaks at 1,530 $cm^{-1}$ and 1,610 $cm^{-1}$ assigned to phenyl groups bonded at the meta-positions. By the presence of peaks at 1,170 $cm^{-1}$ and 1,250 $cm^{-1}$, it is confirmed that the para type polyaniline is also formed in small amounts.

As to the bonding of aromatic rings in repeating units of the polyaniline obtained by this manufacturing method, usually 60 mole percent or more, preferably 70 mole percent or more, and more preferably 80 mole percent or more of the aromatic rings are bonded at the meta-positions. The above-mentioned formation ratio is calculated from the area ratio of absorption peaks of phenyl groups assigned to the respective compositions, which is determined by the IR measurement.

For increasing the bonding ratio at the meta-positions, the reaction solvent is changed from a conventional acidic aqueous solution to a neutral to alkaline aqueous solution or an organic solvent, and the addition speed of the oxidizing agent is decreased. This method can minimize the amount of a substance represented by the following formula (IV), which is stable and highly reactive in an acidic solution, and liable to form the para type polyaniline in polymerization.

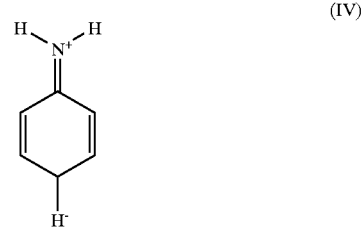

(IV)

The molecular weight of the meta type polyaniline obtained depends on the time taken to add the oxidizing agent. For example, when the concentration of aniline contained in the reaction solution is 6.7% by volume, addition of the oxidizing agent all at once gives a inherent viscosity ($\eta_{inh}$) of 0.07, addition thereof for 6 hours gives a inherent viscosity ($\eta_{inh}$) of 0.13, and addition thereof for 12 hours gives a inherent viscosity ($\eta_{inh}$) of 0.22.

Further, the molecular weight of the meta type polyaniline also depends on the solution concentration. For example, when the oxidizing agent is added for 12 hours, a concentration of aniline in the reaction solution of 6.7% by volume gives a inherent viscosity ($\eta_{inh}$) of 0.22, and a concentration of 13.3% by volume gives a inherent viscosity ($\eta^{inh}$) of 1.14.

When water is used in the polymerization reaction of the meta type polyaniline, the PH of the reaction solution is kept preferably at 7 or more (under neutral to alkaline conditions), and more preferably at 10 to 14.

When the PH of the reaction solution is less than 7, the formation of the para type polyaniline increases to generate electrical conductivity, therefore becoming inadequate for the solid polymer electrolyte membrane application.

The PH is adjusted by using a 0.1 to 2 M aqueous solution of NaOH or KOH as the reaction solution, and controlling the concentration of NaOH or KOH.

The polyaniline of the invention may have substituents on the aromatic rings in the repeating units thereof.

The proton conducting polymer of the invention is obtained by doping the polyaniline with the strong acid or the acid compound.

The strong acids used in doping are preferably phosphoric acid, sulfonic acid and sulfuric acid. The acid compounds include acid compounds in which hydrogen atoms of sulfuric acid, sulfonic acid, phosphoric acid, phosphorous acid and the like are substituted by phenyl group-containing functional groups.

Of the acid compounds, an acid compound in which a hydrogen atom of phosphoric acid is substituted by a phenyl group-containing functional group, that is to say, an organic phosphoric acid compound, is preferred. The organic phosphoric acid compounds include phenylphosphoric acid derivatives represented by the following general formula (V) and diphenylphosphoric acid derivatives represented by the following general formula (VI):

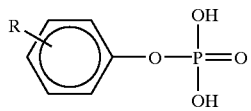

wherein R represents a hydrogen atom, an alkyl group having 1 to 5 carbon atoms, a halogen atom or a nitro group;

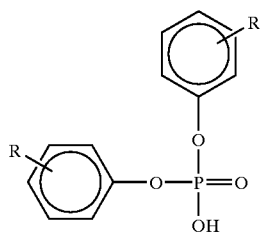

wherein R represents a hydrogen atom, an alkyl group having 1 to 5 carbon atoms, a halogen atom or a nitro group.

Examples of the phenylphosphoric acid derivatives include alkyl-substituted phenylphosphoric acids such as phenylphosphoric acid, o-toluylphosphoric acid, p-toluylphosphoric acid, o-ethylphenylphosphoric acid, p-ethylphenylphosphoric acid and p-isopropylphenylphosphoric acid;

halogen-substituted phenylphosphoric acids such as o-chlorophenylphosphoric acid, p-chlorophenylphosphoric acid and p-bromophenylphosphoric acid; and nitrophenylphosphoric acids such as m-nitrophenylphosphoric acid.

Further, examples of the diphenylphosphoric acid derivatives include di(alkyl-substituted phenyl)phosphoric acids such as diphenylphosphoric acid, di(o-toluyl)phosphoric acid, di(p-toluyl) phosphoric acid, di(o-ethylphenyl) phosphoric acid, di(p-ethylphenyl)phosphoric acid and di(p-isopropylphenyl)phosphoric acid; di(halogen-substituted phenyl)phosphoric acids such as di(o-chlorophenyl) phosphoric acid, di(p-chlorophenyl)phosphoric acid and di(p-bromophenyl)phosphoric acid; and di(nitrophenyl) phosphoric acids such as di(m-nitrophenyl)phosphoric acid.

Furthermore, the phosphorous acid compounds in each of which a hydrogen atom of phosphorous acid is substituted by a phenyl group-containing functional group include phenyl-phosphorous acid derivatives represented by the following general formula (VII). Examples thereof include phenyl-phosphorous acid; di(alkyl-substituted phenyl) phosphorous acids such as diphenylphosphorous acid, di(o-toluyl)-phosphorous acid, di(p-toluyl)phosphorous acid, di(o-ethylphenyl) phosphorous acid, di(p-ethylphenyl) phosphorous acid and di(p-isopropylphenyl)phosphorous acid; di(halogen-substituted phenyl)phosphorous acids such as di(o-chlorophenyl)phosphorous acid, di(p-chlorophenyl) phosphorous acid and di(p-bromophenyl)phosphorous acid; and di(nitrophenyl)phosphorous acids such as di(m-nitrophenyl)-phosphorous acid.

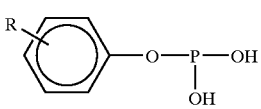

wherein R represents a hydrogen atom, an alkyl group having 1 to 5 carbon atoms, a halogen atom or a nitro group.

The use of the organic phosphoric acid compounds as the dopants decreases the water absorption of the solid polymer electrolyte membranes comprising the proton conducting polymers of the invention lower than before the doping, resulting no occurrence of wrinkles caused by water absorption even in the presence of water.

Usually, the doping is carried out by the following three methods:

(1) A method of blending a polymer with a dopant (acid component) in a solvent in which the polymer, the dopant and an acid-doped polymer obtained by doping the polymer with the acid component are all soluble to conduct film formation and doping at the same time (solution blend method);

(2) A method of immersing a polymer film in a dopant solution (immersing method); and (3) A method of bringing a polymer solution into contact with a dopant solution at an interface to conduct film formation and doping at the same time (interfacial coagulation method).

For the doping for preparing the proton conducting polymers of the invention, the above-mentioned (1) solution blend method is particularly preferred.

In the invention, the solvents used in the solution blend method are required to dissolve not only the polyanilines and the dopants, but also the acid-doped polymers produced. For this reason, the solvents such as NMP and DMSO used as the solvents for the polyanilines can not be used because of very low solubility of the acid-doped polyanilines (proton conducting polymers) produced therein. The acid-doped polyanilines produced are dissolved only in strong acids such as concentrated sulfuric acid and methanesulfonic acid. However, it is difficult to treat these strong acids after film formation. Consequently, the solvent used in the solution blend method is preferably trifluoroacetic acid.

In the solution blend method, the temperature at which the polyanilines are dissolved in the solvents is from room temperature to 200° C., and preferably from 40° C. to 120° C. The concentration of the polyanilines contained in the solutions is form 1% to 50% by weight, and preferably from 5% to 30% by weight.

The solution blend method has the advantage that the organic phosphoric acid compounds, preferred dopants in the invention, can be used.

In the solution blend method, a polyaniline powder is dissolved in the solvent such as trifluoroacetic acid at the above-mentioned temperature, and then, a specified amount of the dopant is added thereto, followed by stirring at room temperature. After stirring overnight, the homogenized solution is cast on a sheet such as a polytetrafluoroethylene (PTFE) sheet. Then the solvent is removed at 0° C. to 100° C., preferably at about 40° C., at ordinary pressure, followed by vacuum drying at room temperature to 200° C., preferably at about 80° C. The thickness of the resulting polyaniline film is usually from 10 μm to 200 μm, and preferably from 30 μm to 150 μm. The dope amount can be calculated from the charged amount ratio of the polyaniline to the dopant.

When the strong acids are used as the dopants, the immersing method can also be used. The strong acids have high affinity for water and methanol, so that highly concentrated dopant solutions can be easily prepared. For example, when PBI is used as the polymer and phosphoric acid is used as the dopant, a methanol solution having a phosphoric acid concentration of about 80% by weight is used as the dopant solution for conducting doping with 5 molecules of phosphoric acid per repeating structure unit of PBI. The immersing method requires such highly concentrated dopant solutions, so that it can not be employed as the doping method in the invention, except for the case that the strong acids are used as the dopants.

For preparing polyaniline films used in the immersing method, polyaniline solutions are first prepared. Solvents for preparing the polyaniline solutions include, for example, NMP, DMSO, DMAc and DMF.

The polyaniline solution is prepared usually at room temperature to 200° C., preferably at room temperature to 120° C. Usually, for homogeneously dissolving the polyaniline, the solution is heated below the boiling point of the solvent, stirred to dissolve the polyaniline, and cooled to room temperature. Then, the solution is adjusted so as to give a viscosity of 50 to 4,000 poises, preferably 400 to 600 poises, at 30° C. The viscosity of the above-mentioned polyaniline solution depends on the temperature, and the degree of polymerization and solution concentration of the polyaniline. In general, when the viscosity of the polyaniline solution is less than 50 poises, film formation itself is difficult. On the other hand, exceeding 4,000 poises results in too high viscosity, which makes it difficult to prepare homogeneous films.

The polymer solution thus obtained can be cast on, for example, glass plates, and the solvent is removed by an ordinary method to prepare polyaniline films.

The thickness of the resulting polyaniline film is usually from 10 $\mu$m to 200 $\mu$m, and preferably from 50 $\mu$m to 150 $\mu$m.

Solvents for the dopant solutions include tetrahydrofuran (THF), water, methanol, ethanol, n-hexane and methylene chloride. In this case, the concentration of the dopant solution is from 10% to 95% by weight, and preferably from 50% to 90% by weight. When the concentration is less than 10% by weight, the dope amount is decreased to cause reduced proton conductivity of the resulting dope film. On the other hand, exceeding 95% by weight results in dissolution of the polyaniline film in the dopant solution. The dopant solution is prepared at room temperature, at which usually, the dopant is easily homogeneously dissolved.

In the immersing method, the polyaniline films formed from the polyaniline solution as described are immersed in the dopant solution at room temperature for 5 to 72 hours, followed by vacuum drying at room temperature to 200° C., preferably at 40° C. to 80° C. Then, the dope amount is calculated from an increase in weight from before doping to after doping.

When the organic phosphoric acid compounds are used as the dopants in the immersing method, the conductivity of the resulting acid-doped polyanilines (proton conducting polymers) is lowered, because the acid dissociation constant of the organic phosphoric acid compounds is low. Further, the organic phosphoric acid compounds are large in size as the dopants, so that diffusion thereof inside the polyanilines is anticipated to be difficult. Furthermore, different from the strong acids, the organic phosphoric acid compounds are low in the solubility in solvents, and it is therefore difficult to obtain the highly concentrated solutions required for the dopant solutions. In the invention, therefore, the solution blend method is preferably used.

As described above, the proton conducting polymers of the invention are obtained by doping the polyanilines with the acid components.

The proton conductivity of the proton conducting polymers is measured, using the vacuum-dried proton conducting polymer films as samples, as follows.

Complex impedance measurements are made with an impedance analyzer "YHP 4192A" manufactured by YOKOGAWA-HEWLETT PACKARD, LTD. in a dried state at 750 mV, using four terminals or two terminals. The direct current component R is read from Cole-Cole plots, and the proton conductivity can be calculated therefrom.

The proton conductivity of a proton conducting polymer obtained by doping the meta type polyaniline with 0.75 molecule per repeating unit of diphenylphosphoric acid by the solution blend method is from $1.0 \times 10^{-2.5}$ to $1.0 \times 10^{-1.8}$ S/cm at 75° C. to 126° C. On the other hand, the proton conductivity of conventional acid-doped PBI obtained by doping PBI with 1.0 molecule per N—H group of diphenylphosphoric acid is from $1.0 \times 10^{-3.5}$ to $1.0 \times 10^{-2.8}$ S/cm at 75° C. to 126° C. As can be seen from above, the proton conducting polymer of the invention shows excellent proton conductivity, compared with conventional acid-doped PBI.

The proton conducting polymers of the invention can be formed in to the solid polymer electrolyte membranes used in fuel cells, particularly in DMFCs.

The proton conducting polymer films obtained by the above-mentioned solution blend method or immersing method can be used as the solid polymer electrolyte membranes for fuel cells.

The methanol barrier property of the solid polymer electrolyte membrane is measured in the following manner.

That is to say, the solid polymer electrolyte membrane having an area of 9 cm$^2$ is incorporated into a fuel cell to partition the cell into an anode chamber and a cathode chamber, and the cell is sealed. Keeping the cell temperature at 70° C., a 1 M aqueous solution of methanol pressurized to 0.5 kgf/cm$^2$ is supplied into the anode chamber at 0.5 ml/minute. Dry air is allowed to flow in the cathode chamber on the opposite side through an inlet at ordinary pressure, and a membrane-permeated material is collected with a cold trap of liquid nitrogen from a gas exhausted through an outlet. The permeation amount of methanol (g/cm$^2$) is calculated from the weight of the collected material (membrane-permeated material) and the composition determined by gas chromatographic analysis, which is employed as evaluation results of methanol permeability.

The above-mentioned permeation amount of methanol of the solid polymer electrolytes of the invention is far lower than that of the conventional Nafion hydrated membranes. That is to say, the membranes comprising the solid polymer electrolytes of the invention are excellent in methanol barrier property.

The proton conducting polymers of the invention can also be mixed with fine catalyst particles carried on porous particles to use the resulting products as electrodes of fuel cells.

The electrodes of fuel cells usually include ones obtained by directly applying electrode paste comprising the fine catalyst particles carried on the porous particles and an alcohol solution of the solid polymer electrolyte which is an ion conductive component, onto a gaseous diffusion electrode base material, and removing the solvent. The electrode paste can also be directly applied onto the solid polymer electrolyte membranes.

The raw materials for the fine catalyst particles include platinum and an alloy of platinum and at least one selected from the group consisting of chromium, titanium and tungsten, and platinum is preferred.

The fine catalyst particles are used in the state that they are carried on the porous particles. As the porous particles, highly structured carbon particles having large average specific surface area, which are produced by the Ketjen process or the acetylene process, are suitably used.

The fine catalyst particles carried on the porous particles include a platinum catalyst carried on carbon, which is prepared by allowing carbon to support 10% to 30% by weight of platinum by a conventional method.

Methods for mixing the proton conducting polymers of the invention with the fine catalyst particles carried on the porous particles (hereinafter referred to as a "platinum catalyst carried on carbon") include, for example, a method of mixing a polyaniline-diphenylphosphoric acid blend solution obtained by the solution blend method with the platinum catalyst carried on carbon to form electrode paste to be applied onto the gaseous diffusion electrode base material.

Further, the methods for mixing the proton conducting polymers (acid-doped polyanilines) with the platinum catalysts carried on carbon also include a method of mixing the proton conducting polymer and the platinum catalyst carried on carbon with a solvent to form electrode paste.

As the above-mentioned solvents used in mixing the proton conducting polymers with the platinum catalyst carried on carbon by stirring, any solvents can be used as long as they disperse the porous particles well and do not deteriorate the functions of the solid polymer electrolyte membranes. For example, ethylene glycol and a 50/50% (by volume) mixture of ethylene glycol monoisopropyl ether and isopropanol are suitably used. Further, solvents unreactive to oxygen such as water, ketones and esters can be added to and mixed with them to such a degree that Theological characteristics such as the kinematic viscosity of the electrode paste for formation of electrode catalyst layers are not impaired.

The order of mixing the proton conducting polymer powder, the platinum catalyst carried on carbon and the solvent may be any, and can be appropriately selected. The resulting electrode paste is applied onto the gaseous diffusion electrode base materials by conventional procedures.

Here, the gaseous diffusion electrode base materials are so-called electron conductive supports, which include, for example, carbon paper and carbon cloth. In particular, the carbon paper is a porous base material, and particularly has many pores (voids) because it is produced by the papermaking method.

The gaseous diffusion electrode base materials and/or solid polymer electrolyte membranes can be coated with the electrode paste by the conventional kiss coat method, doctor blade method and screen printing method.

Then, the electrode paste layers applied and fixed onto the gaseous diffusion electrode base materials are heated and dried in an inert gas atmosphere to remove the organic solvents contained in the paste, thereby forming the catalyst layers comprising the platinum catalysts carried on carbon and the proton conducting polymers on the gaseous diffusion electrode base materials.

In this case, nitrogen or argon can be suitably used as the inert gas. First, alcohol components are removed at 50° C. to 80° C. at ordinary pressure, and then, organic solvents such as ethylene glycol can be removed by heating at the same temperature under reduced pressure.

The catalyst layers formed on the gaseous diffusion electrode base materials, which are obtained according to the above-mentioned steps, can be attached to the solid polymer electrolyte membranes by thermocompression bonding. The attachment can be suitably carried out preferably at a temperature of 120° C. to 150° C. at a pressure of 20 to 200 kg/cm$^2$ by hot pressing. Under the conditions of a temperature of less than 120° C. and a pressure of less than 200 kg/cm$^2$, the attachment is insufficient. On the other hand, under the conditions of a temperature exceeding 150° C. and a pressure exceeding 200 kg/cm$^2$ there is a fear of decomposition of the proton conducting polymers. Although the hot pressing time varies with the attachment temperature and pressure, it is usually from 30 to 120 seconds. A hot pressing time of less than 30 seconds results in a fear of insufficient attachment, whereas exceeding 120 seconds results in a fear of decomposition of the proton conducting polymers, or deterioration or deformation of the gaseous diffusion electrode base materials and/or the solid polymer electrolyte membranes.

In the above-mentioned steps, polytetrafluoroethylene resin solutions and thickening agents ordinarily used as electrode constituting material components can be safely mixed, in addition to the platinum catalysts carried on carbon, the proton conducting polymers and the solvents.

The electrodes in which surfaces of the fine catalyst particles are covered with the proton conducting polymers of the invention show the effect of preventing the catalysts from being poisoned without a decrease in catalytic activity. The amount of the proton conducting polymers that have covered the catalyst particles can be evaluated by measuring the amount of carbon monoxide (CO) absorbed.

The solid polymer electrolytes comprising the proton conducting polymers of the invention are excellent in proton conductivity and methanol barrier property, and also very high in dope stability in aqueous solutions of methanol. They are therefore very useful as solid polymer electrolyte membrane materials for fuel cells, particularly for liquid supply type DMFCs. Further, the electrodes containing proton conducting polymers of the invention and the fine catalyst particles carried on the porous particles are high in activity, so that they are very useful as electrodes of fuel cells.

The present invention will be illustrated with reference to examples in more details below, but these examples are not intended to limit the scope of the present invention. Parts and percentages in the examples and comparative examples are on a weight basis, unless otherwise specified. Various evaluations were conducted as follows.

IR Absorption Spectrum

The IR absorption spectrum was measured by the reflective diffusion method, using a 20DXB FT-IR spectrometer manufactured by Nicolet Analytical Instruments.

Inherent Viscosity ($\eta_{inh}$)

The relative viscosity ($\eta_{rel}$) of a 0.5% concentrated sulfuric acid solution of a polymer was measured with a capillary viscometer, and the inherent viscosity was calculated therefrom.

Proton Conductivity

A vacuum-dried proton conducting polymer film was used as a sample for proton conductivity measurements. Complex impedance measurements were made with an impedance analyzer "YHP 4192A" manufactured by YOKOGAWA-HEWLETT PACKARD, LTD. in a dried state at 750 mV, using two terminals. The direct current component R was read from Cole-Cole plots, and the proton conductivity (S/cm) was calculated therefrom.

Methanol Barrier Property

A solid polymer electrolyte membrane having an area of 9 cm$^2$ was incorporated into a fuel cell to partition the cell into an anode chamber and a cathode chamber, and the cell is sealed. Keeping the cell temperature at 70° C., a 1 M aqueous solution of methanol pressurized to 0.5 kgf/cm$^2$ was supplied into the anode chamber at 0.5 ml/minute. Dry air was allowed to flow in the cathode chamber on the opposite side through an inlet at ordinary pressure, and a membrane-permeated material is collected with a cold trap of liquid nitrogen from a gas exhausted through an outlet. The permeation amount of methanol (g/cm$^2$) was calculated from the weight of the collected material and the composition determined by gas chromatographic analysis, which was employed as evaluation results of the methanol barrier property.

REFERENCE EXAMPLE 1
(Preparation of Meta Type Polyaniline)

Aniline (16.5 ml) was dissolved in 248 ml of NMP to prepare an NMP solution of aniline. Then, 41.3 g of ammonium peroxodisulfate was added to the NMP solution of aniline at −5° C. to 0° C. for 12 hours, followed by stirring overnight while gradually restoring the temperature to room temperature. The reaction solution was poured into a large excess of deionized water to obtain a solid material. The solid material thus obtained was repeatedly washed with deionized water and acetone, followed by washing with deionized water. Then, the solid material is vacuum dried at 100° C. to obtain a meta type polyaniline. The resulting meta type polyaniline had a inherent viscosity $\eta_{inh}$ of 0.22.

The polyaniline thus obtained blended with 0.5 molecule of diphenylphosphoric acid per repeating unit and cast to obtain an acid-doped polyaniline (proton conducting polymer) film. An IR chart thereof is shown in FIG. 1. Absorption peaks at 1,530 cm$^{-1}$ and 1,610 cm$^{-1}$ assigned to phenyl groups bonded at the meta-positions were confirmed. Absorption peaks at 1,170 cm$^{-1}$ and 1,250 cm$^{-1}$ assigned to phenyl groups bonded at the para-positions were also confirmed. As to the bonding of aromatic rings in repeating units of the above-mentioned polyaniline, 97 mole percent of the aromatic rings were bonded at the meta-positions.

REFERENCE EXAMPLE 2

A meta type polyaniline was obtained in the same manner as with Reference Example 1 with the exception that ammonium peroxodisulfate was added for 6 hours. The resulting meta type polyaniline had a inherent viscosity $\eta_{inh}$ of 0.07. As to the bonding of aromatic rings in repeating units of the above-mentioned polyaniline, 85 mole percent of the aromatic rings were bonded at the meta-positions.

REFERENCE EXAMPLE 3

A meta type polyaniline was obtained in the same manner as with Reference Example 1 with the exception that ammonium peroxodisulfate was added all at once. The resulting meta type polyaniline had a inherent viscosity $\eta_{inh}$ of 0.13. As to the bonding of aromatic rings in repeating units of the above-mentioned polyaniline, 81 mole percent of the aromatic rings were bonded at the meta-positions.

REFERENCE EXAMPLE 4

A meta type polyaniline was obtained in the same manner as with Reference Example 1 with the exception that 124 ml of NMP was used. The resulting meta type polyaniline had a inherent viscosity $\eta^{inh}$ of 1.14. As to the bonding of aromatic rings in repeating units of the above-mentioned polyaniline, 96 mole percent of the aromatic rings were bonded at the meta-positions.

EXAMPLE 1
(Production of Acid-Doped Polyaniline Film)

In 20.0 ml of trifluoroacetic acid, 2.00 g of the meta type polyaniline obtained in Reference Example 1 was dissolved at a concentration of 10%, and diphenylphosphoric acid [R=H in general formula (VI)], a commercially available special grade chemical, was added thereto in an amount of 0.75 molecule per repeating unit of the charged polyaniline, followed by stirring at room temperature overnight. The homogenized solution was cast on a PTFE sheet on a hot plate by using a doctor blade, and the solvent was evaporated at 40° C. then, vacuum drying was carried out at 80° C. to obtain an acid-doped aniline (proton conducting polymer) film. The resulting acid-doped polyaniline film had a thickness of 30 μm to 60 μm.

Figure 2:
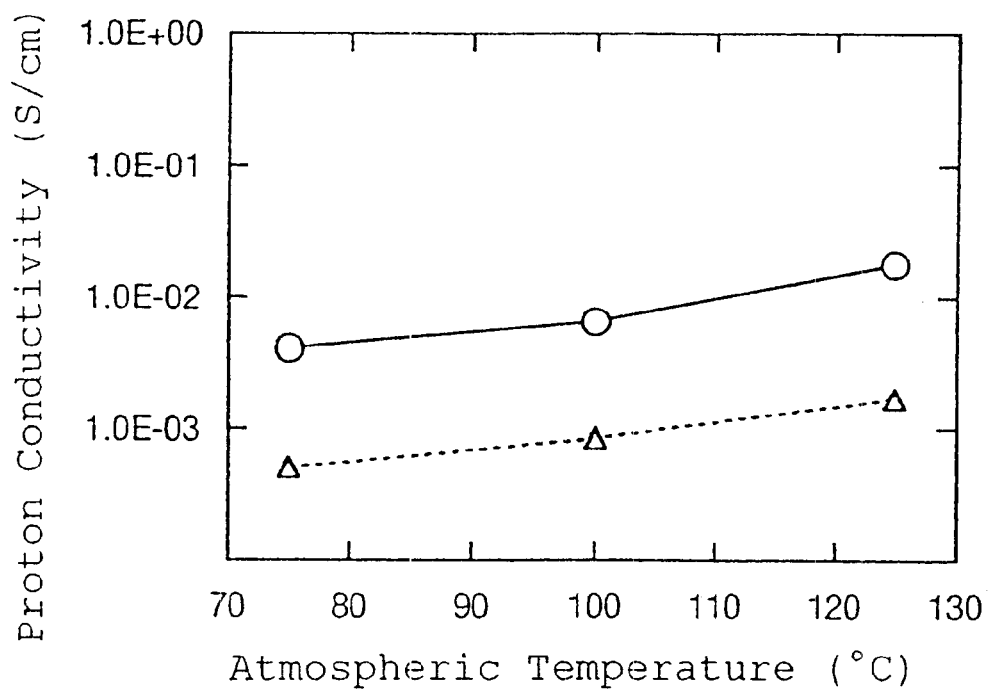
FIG. 2 is a graph showing the relationship between the proton conductivity and the atmospheric temperatures, for an acid-doped polyaniline film of Example 1 and an acid-doped PBI film of Comparative Example 1.

The relationship between the proton conductivity of the resulting acid-doped polyaniline film and atmospheric temperatures is shown in the graph of FIG. 2.

Using this acid-doped polyaniline film as a solid polymer electrolyte membrane, the methanol barrier property was evaluated. The permeation rate of methanol was $1.5 \times 10^{-6}$ g/cm$^2$ minute.

REFERENCE EXAMPLE 5
(Preparation of PBI)

Poly[2,2'-(m-phenylene)-5,5'-bibenzimidazole] was used as PBI, an imidazole ring-containing polymer. PBI powder (trade name: CELAZOLE) manufactured by Aldrich Chemical Co., Inc. was dissolved in dimethylacetamide at a concentration of 10%, and the resulting solution was filtered under pressure. Then, the solution was coagulated in distilled water, and the resulting purified product was vacuum dried, pulverized and used as PBI powder.

COMPARATIVE EXAMPLE 1
(Production of Acid-Doped PBI Film)

An acid-doped PBI film was obtained in the same manner as with Example 1 with the exception that 2.00 g of PBI powder was used and the amount of diphenylphosphoric acid was changed to 2 molecules per repeating unit. The resulting acid-doped PBI film had a thickness of 30 μm to 60 μm.

The relationship between the proton conductivity of the resulting acid-doped PBI film and atmospheric temperatures is shown in the graph of FIG. 2.

Using this acid-doped PBI film as a solid polymer electrolyte membrane, the methanol barrier property was evaluated. The permeation rate of methanol was $1.82 \times 10^{-6}$ g/cm$^2$·minute.

COMPARATIVE EXAMPLE 2
(Nafion 112 Film)

Various evaluations were similarly conducted by using a hydrated membrane of Nafion 112 manufactured by E. I. du Pont de Nemours and Company.

Using the hydrated membrane of Nafion 112 as a solid polymer electrolyte membrane, the methanol barrier property was evaluated. The permeation rate of methanol was $1.7 \times 10^{-3}$ g/cm$^2$·minute.

COMPARATIVE EXAMPLE 3
(Nafion 117 Film)

Various evaluations were similarly conducted by using a hydrated membrane of Nafion 117 manufactured by E. I. du Pont de Nemours and Company.

Using the hydrated membrane of Nafion 117 as a solid polymer electrolyte membrane, the methanol barrier property was evaluated. The permeation rate of methanol was $1.2 \times 10^{-3}$ g/cm$^2$·minute.

From the results of FIG. 2, the acid-doped polyaniline film of Example 1 showed extremely high proton conductivity, compared with the acid-doped PBI film of Comparative Example 1. The dopant amount in Example 1 was 0.75 molecule per repeating unit, and that in Comparative Example 1 was 1 molecule per repeating unit. The acid-doped polyaniline film of Example 1 showed high proton conductivity, although the dopant amount thereof was smaller than that of the acid-doped PBI film of Comparative Example 1. From the above, it is considered that the meta type polyaniline is high in N—H group density compared with PBI, because of its simple molecular structure, which causes an increase in proton conductivity when doped with the acid.

Further, the methanol barrier property of the acid-doped polyaniline film was very high, compared with the conventional hydrated membranes of Nafion 112 and Nafion 117.

The solid polymer electrolytes comprising the proton conducting polymers of the invention are excellent in proton conductivity, methanol barrier property and dopant stability in aqueous solutions of methanol. They are therefore very useful as solid polymer electrolyte membrane materials for fuel cells, particularly for DMFCs. Further, the electrodes containing proton conducting polymers of the invention and the fine catalyst particles carried on the porous particles are high in catalyst activity, and very useful as electrodes of fuel cells.

What is claimed is:

1. A proton conducting polymer obtained by doping a polyaniline with a strong acid or an acid compound, wherein the polyaniline is produced from a starting material selected from the group consisting of aniline, toluidine, anisidine, aminobenzoic acid, and aminobenzotrifluoride, and wherein 70 mole percent or more of the aromatic rings in the repeating units of the polyaniline are bonded at the meta-position.

2. The proton conducting polymer according to claim 1, wherein the aromatic rings in the repeating units of the polyaniline have substituents.

3. The proton conducting polymer according to claim 1, wherein the strong acid or the acid compound is an inorganic acid or an organic phosphoric acid compound.

4. The proton conducting polymer according to claim 3, wherein the inorganic acid is selected from the group consisting of phosphoric acid and sulfuric acid.

5. A method for producing the proton conducting polymer according to any one of claims 1, 2, or 3, which comprises dissolving a polyaniline and an organic phosphoric acid compound in a common solvent, and casting the resulting solution.

* * * * *

UNITED STATES PATENT AND TRADEMARK OFFICE
CERTIFICATE OF CORRECTION

PATENT NO. : 6,478,987 B1 Page 1 of 1
DATED : November 12, 2002
INVENTOR(S) : Akita et al.

It is certified that error appears in the above-identified patent and that said Letters Patent is hereby corrected as shown below:

Column 6,
Line 34, replace "viscosity $\eta^{inh}$ of" with -- viscosity ($\eta_{inh}$) of --;

Column 10,
Line 16, replace "formed in to the solid" with -- formed into the solid --;

Column 11,
Line 26, replace "that Theological characteristics" with -- that rheological characteristics --;

Column 13,
Line 55, replace "viscosity $\eta^{inh}$ of" with -- viscosity $\eta_{inh}$ of --;

Column 14,
Line 14, replace "g/cm² minute" with -- $g/cm^2 \cdot minute$ --;

Signed and Sealed this

Sixteenth Day of December, 2003

JAMES E. ROGAN
*Director of the United States Patent and Trademark Office*